United States Patent [19]

Hebert

[11] Patent Number: 5,451,356
[45] Date of Patent: Sep. 19, 1995

[54] METHOD OF FORMING PERFORATIONS IN A STRUCTURE DURING MOLDING THEREOF

[75] Inventor: Gregg A. Hebert, Conyers, Ga.

[73] Assignee: Mobil Oil Corporation, Fairfax, Va.

[21] Appl. No.: 216,999

[22] Filed: Mar. 24, 1994

[51] Int. Cl.⁶ .............................................. B29C 51/32
[52] U.S. Cl. ................................ 264/163; 264/321; 264/322; 425/4 C; 425/292; 425/817 C
[58] Field of Search ................ 425/290, 292, 817 C, 425/4 C; 264/163, 156, 153, 322, 321

[56] References Cited

U.S. PATENT DOCUMENTS

| | | | |
|---|---|---|---|
| 3,360,420 | 12/1967 | Paul et al. | 264/163 |
| 3,475,526 | 10/1969 | Seto | 264/163 |
| 3,518,334 | 6/1970 | Carrigan et al. | 264/163 |
| 4,304,747 | 12/1981 | Lake | 264/163 |
| 4,477,243 | 10/1984 | Wallsten | 425/292 |

FOREIGN PATENT DOCUMENTS

| | | | |
|---|---|---|---|
| 2833578 | 2/1980 | Germany | 425/292 |
| 3336358 | 4/1985 | Germany | 425/292 |

*Primary Examiner*—Jay H. Woo
*Assistant Examiner*—Duane S. Smith
*Attorney, Agent, or Firm*—Alexander J. McKillop; Malcolm D. Keen; Clinton H. Hallman, Jr.

[57] ABSTRACT

A thermoforming technique for making a shaped article from a web of polystryrene foam sheet or the like, with simultaneous forming and perforation of the article. Serrated cutter and spaced mandrel elements mounted in opposing mold sections provide a perforated pattern in the sheet.

6 Claims, 1 Drawing Sheet

METHOD OF FORMING PERFORATIONS IN A STRUCTURE DURING MOLDING THEREOF

FIELD OF THE INVENTION

The present invention relates to techniques for forming perforations in a moldable structure during the shape molding of a thermoplastic web, such as foamed polystyrene.

BACKGROUND OF THE INVENTION

Thermoplastic containers and other foam products are often made of polystyrene sheet materials. U.S. Pat. Nos. 4,832,885 (Gross) and 5,032,106 (Warburton) disclose typical prior methods and equipment for thermoplastic molding of containers.

Automatic thermoforming equipment designed to form a one or more structures simultaneously are often large units of equipment which are designed for continuous operation. This equipment utilizes male and female mold members which define the thermoformed structures. Each half of the mold is a massive machined tool member which must stand up to repetitive thermoforming operations which not only involve physical force but rapid and wide changes in temperature. Failure of even the smallest component of the mold structures will cause a shutdown of the thermoforming apparatus.

Thermoplastic articles may be advantageously formed with perforated portions which are may be torn along a predetermined line. For instance, foamed styrenic polymer, such as general purpose homopolymer, high impact polystyrene or copolymer resins may be thermoformed to produce food service disposable containers with such features as tear-off lids or punch-out steam vents. Foamed sheet material having transverse perforated tear lines are useful as insulation baffles.

Such perforated articles are conventionally made in a two step process with thermal shaping followed by a separate cutting step. This requires significant investment in equipment and complicates manufacturing methods.

A novel thermoforming technique has been found which provides for simultaneous thermoforming and perforation of a thermoplastic web, such as oriented polystyrene, which may be foamed opaque or clear.

SUMMARY OF THE INVENTION

The present invention is concerned with the process of creating perforated designs in a thermoplastic part during the shape molding thereof. In particular it provides a technique for thermoforming plastic articles from a continuous web of thermoplastic sheet having uniform thickness and containing foam cells, comprising the methods and means for: (a) moving and heating the web to soften the thermoplastic sheet prior to thermoforming; (b) advancing the heated web between opposed mold members, at least one of said mold members having mounted thereon a fixed perforation cutting member adapted for cutting selected portions of the heated web, and at least one opposing mold member having mounted thereon an mandrel means having a pair of spaced mandrel faces adapted to receive the cutting member during molding operation; and (c) closing said mold members to form a plastic article, while simultaneously piercing the web to form a perforated pattern. This techniques is especially useful in single-step thermoforming and perforation of foamed polystyrene sheet or the like.

DETAILED DESCRIPTION OF THE PRESENT INVENTION

Figure 1:
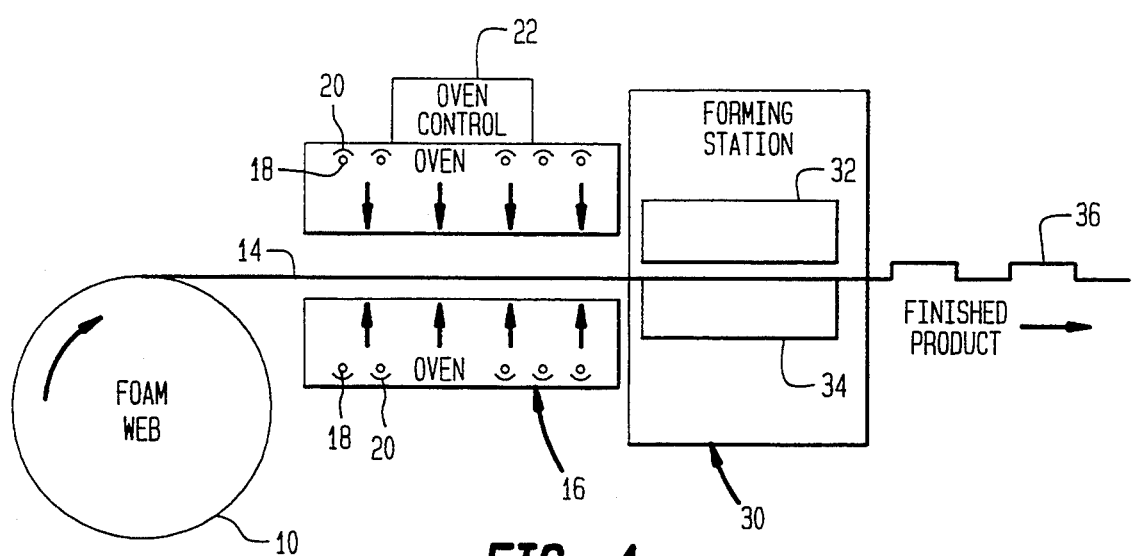
FIG. 1 is a schematic side view of a thermoforming manufacturing operation.

The present invention is best understood by reference to the appended figures, which are given by way of example and not of limitation. Referring now to FIG. 1, a side view of a typical continuous molding operation illustrates the main component parts of the system including a web roll 10 having means for advancing a continuous sheet 14 into an oven 16, which typically comprises an array of radiant heater elements 18, reflectors 20 and temperature control means 22. After being heated to the thermoplastic softening point, the heated sheet advances to a forming station 30 having a movable opposed mold pair which, during the molding of a heat softened plastic sheet, simultaneously with the shape molding of the plastic, will form a pattern of perforations therein, as will be shown in the following description. As those skilled in the art will plainly understand, although reference will be made to the mold members shown in the drawings as "top" or "bottom", it is to be recognized that the top mold 32 and bottom mold 34 members may be reversed and therefore it is only their relative position that is important. Moreover, the location of the specific component parts as being in the top or bottom mold member is for illustration only. As can be envisioned, the relative locations of the components for the perforating means can be reversed and still function in the same desirable manner.

FIG. 1 shows top mold member 32 spaced apart from bottom mold member assembly 34. These mold members are shown open during molding operation in which a heat softened sheet of thermoplastic material 14 is being shape formed. Although the schematic mold members shown are shown for for use in the shape molding of containers or the like, a wide variety of structures are clearly benefitted by the practice of the present invention. The molds are cooled to set the softened thermoplastic in the molded shape, after which the finished product 36, with desired shape and perforation pattern, is advanced for downstream processing, printing, trimming, etc. Carried by top mold member 32 is a male perforation cutting member 40, depicted in FIG. 2.

The cutting components area specifically designed for the individual perforation pattern, and should be made of a durable material of construction, such as tempered spring steel or other suitable metal coated with titanium nitride to increase hardness and durability. The serrated blade cutting element is sharpened, typically hollow ground on one side. The blade holder may be stainless steel, and mandrel components may be made of brass alloy metal or other easily constructed material.

Figure 2:
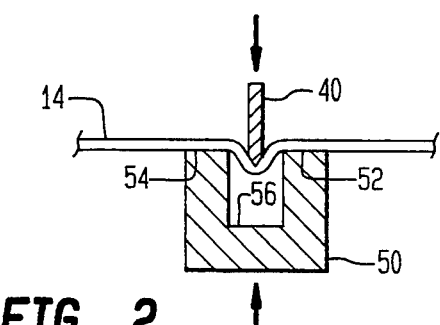
FIG. 2 shows a cross-sectional view of the perforation elements and plastic web during operation.

FIG. 2 is a simplified vertical cross-sectional view of the perforation-making components, shown during closing of the molds. Punch plate cutting element 40 is mounted on a movable top mold (not shown) and thrusts downward into the plane of the thermoplastic sheet 14, which is readily deformed due to its softened condition. Mandrel element 50 is mounted on an opposing bottom mold (not shown) in a position of receive the cutting element 40 as it travels through the plane of the sheet. Mandrel 50 includes two spaced face members 52, 54 having a recess 56 forming a gap therein. Preferably, the cutting member comprises a spaced series of pointed blade teeth having apexes for piercing the web, and the spaced mandrel faces have a gap width not greater than less than 0.5 mm wide, whereby blade segment apexes penetrate the web thickness to provide a corresponding series of perforation slits.

Figure 3:
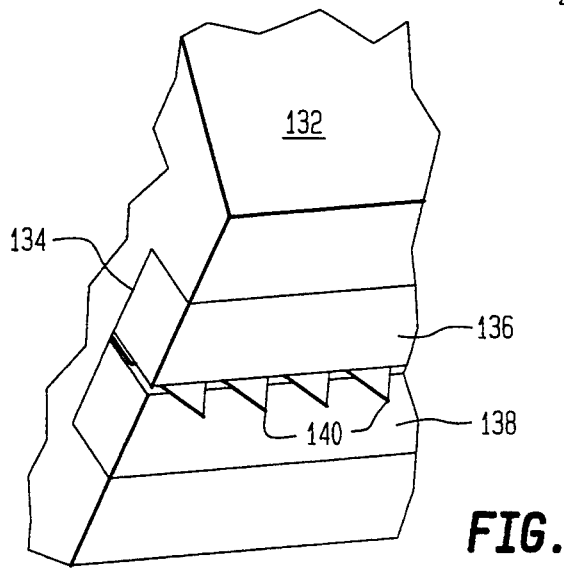
FIG. 3 is an isometric view, partially cut away, showing a male mold piece recessed for holding a serrated blade cutting unit.

FIG. 3 depicts a typical arrangement for mounting the blade cutting element in a mold. An upper mold piece 132 has a channel 134 cut into its lower horizontal face. A mounting assembly including rectangular bars 136 and 138 is disposed on opposite sides of a serrated blade cutting element 140. The mounting assembly is fixed in mold recess channel 134 in a flush position to expose points of the blade 140 a predetermined length.

Figure 4:
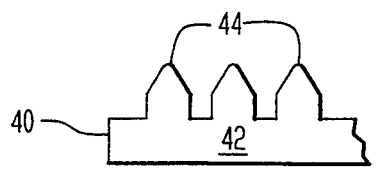
FIG. 4 is a partial side elevation view of a serrated blade element.

FIG. 4 is a detail side view of a serrated blade cutting element 40, showing a uniform shank portion 42 having lateral teeth 44 extending outward and terminating in spaced series of blade points.

As an example of the novel technique, a polystryene web having uniform thickness of about 3 mm ($\frac{1}{8}$-inch) is thermoformed and perforated in a unitary operation with straight-line perforations cut by a spaces series of 0.015-inch thick teeth arranged to leave a 0.035-inch uncut tear portion between teeth cuts. The cutting depth is 0.17–0.2 inch, sufficient to pierce the $\frac{1}{8}$-inch foam sheet. A metal strike bar or mandrel is provided on the opposing mold having a mandrel spacing of 0.040 inch to provide a total clearance of 0.025 inch between blade and mandel face.

The blade structure may be a series of spaced flat knife elements, or other suitable configuration. In one modification the cutter is fabricated with a series of spaced V-shaped teeth forming a serrated line. Various perforation patterns will be apparent to those skilled in the art, including polygons, circles, etc. Different V-shaped teeth angles and spacings or coarser perforations may be employed according to the particular use of the apparatus.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for thermoforming plastic foam sheet articles for transverse tearing from a continuous web of thermoplastic sheet having uniform thickness, comprising the steps of:
   moving and heating the web to soften the thermoplastic sheet prior to thermoforming;
   advancing the heated web between opposed mold members;
   a fixed perforation cutting member mounted in a mold member and adapted for transversely cutting selected portions of the heated web to form a tear line, said cutting member comprising a linear spaced series of pointed blade segments having apexes for partially piercing the web; and an opposing mold member having mounted thereon a mandrel having a pair of spaced mandrel faces adapted to receive the cutting member during molding operation, wherein said spaced mandrel faces have a gap width sufficiently narrow to prevent substantial deformation of the heated web under thermoforming conditions; and
   closing said mold members to form a foam plastic article while simultaneously piercing the foam web to form a perforated pattern in said article, whereby blade segment apexes penetrate the web thickness to provide a corresponding series of perforation slits.

2. The process of claim 1 wherein the thermoplastic sheet consists essentially of oriented styrenic polymer.

3. A pair of mold members and closure means for moving said mold members in operative relationship for making perforations in a container structure during the thermoforming thereof, comprising:
   (a) a pair of mold members having a first mold member and a second mold member;
   (b) a serrated cutting member carried by said first mold member having a linear array of spaced cutting teeth disposed to form a perforation line; and
   (c) a mating mandrel member carried by said second mold member having a pair of spaced mandrel faces adapted to receive the serrated cutting member during molding operation, said mold pair being adapted for perforating a container formed from a heated thermoplastic web under thermoforming conditions, wherein said cutting member comprises a linear spaced series of pointed blade teeth having apexes for piercing the web; and wherein said spaced mandrel faces have a gap width not greater than 0.5 mm wide, whereby blade segment apexes penetrate the web thickness to provide a corresponding series of perforation slits.

4. A process for thermoforming foamed plastic articles from a continuous web of thermoplastic sheet having uniform thickness and containing foam cells, comprising the steps of:
   moving and heating the web to soften the thermoplastic sheet prior to thermoforming;
   advancing the heated web between opposed mold members, at least one of said mold members having mounted thereon a fixed perforation cutting member adapted for cutting a transverse line of perforated slits to form a tear line across selected portions of the heated web, and at least one opposing mold member having mounted thereon a mandrel having a pair of spaced mandrel faces adapted to receive the cutting member during molding operation, said cutting member comprising a spaced series of pointed blade segments having apexes for piercing the web, and said spaced mandrel faces having a gap width sufficiently narrow to prevent substantial deformation of the heated web under thermoforming conditions, whereby blade segment apexes penetrate the web thickness to provide a corresponding series of perforation slits; and
   closing said mold members to form a foam plastic article, while simultaneously piercing the foam web to form a perforated pattern in said article.

5. The process of claim 4 wherein the pointed blade segments are separated from the mandrel faces by at least the average foam cell size.

6. The process of claim 4 wherein the thermoplastic sheet has a uniform thickness in the range of 1 to 5 mm., and wherein the pointed blade segments are separated from the mandrel faces by a gap less than 0.5 mm wide.

* * * * *